April 26, 1960  O. L. RICE  2,934,080
VALVE
Filed Aug. 27, 1958
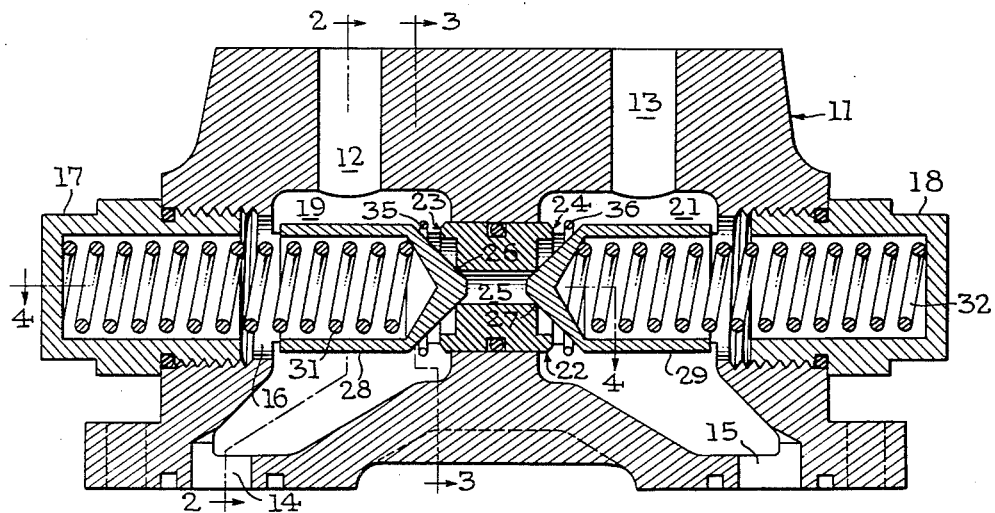
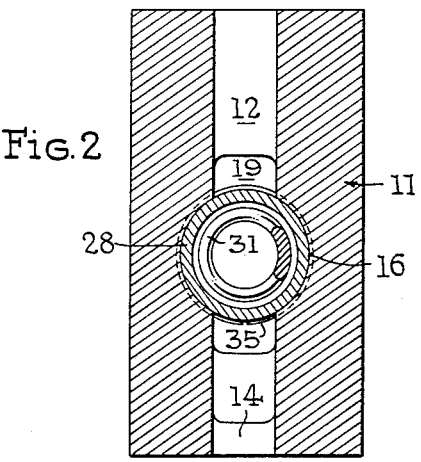
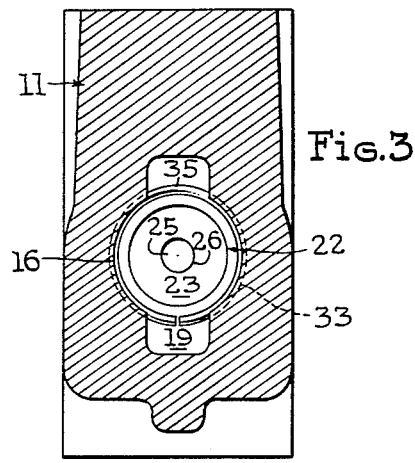
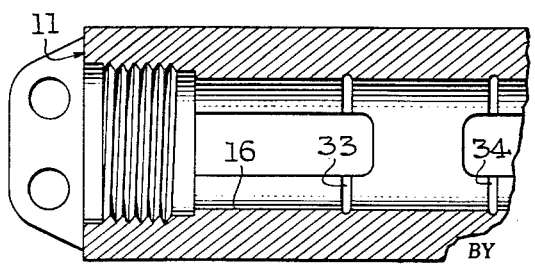
INVENTOR
Orval L. Rice
BY Dodge and Sons
ATTORNEYS

United States Patent Office 2,934,080
Patented Apr. 26, 1960

2,934,080
VALVE

Orval L. Rice, Scotts, Mich., assignor to The New York Air Brake Company, a corporation of New Jersey Application August 27, 1958, Serial No. 757,602

2 Claims. (Cl. 137—93)

This invention relates to two-way relief valves, i.e., valves which maintain a maximum pressure differential between two lines in a hydraulic circuit.

The object of the invention is to provide a valve of this type which is simple and inexpensive to manufacture and yet is efficient and reliable in operation.

The preferred embodiment of the invention will now be described in relation to the accompanying drawing, in which:

Figure 1 is an axial sectional view of the relief valve, the parts being shown in the positions they occupy when the pressures in the two pressure chambers are equal;

Figure 2 is a sectional view taken on line 2—2 of Figure 1;

Figure 3 is a sectional view taken on line 3—3 of Figure 1 showing the installation of one of the limit stops;

Figure 4 is a sectional view of the housing taken on line 4—4 of Figure 1 showing the location and arrangement of the annular grooves in which the limit stops are located.

Referring to the drawing, the valve comprises a housing 11 formed with inlet passages 12 and 13 and outlet passages 14 and 15. Extending through the housing is a valve bore 16 which is closed at its opposite ends by threaded plugs 17 and 18. Intersecting the valve bore 16 are two longitudinally spaced pressure chambers 19 and 21; the chamber 19 being in communication with the passages 12 and 14 and the chamber 21 being in communication with the passages 13 and 15. A reciprocable piston 22 is mounted in the bore between the chambers 19 and 21 and is encircled by a resilient O-ring which prevents leakage between the chambers. The opposite ends of the piston form reaction surfaces 23 and 24 which are subject to the pressures in the chambers 19 and 21 respectively. Extending through the piston 22 is an axial bore 25 whose opposite ends are encircled by valve seats 26 and 27.

Two reciprocable valve heads 28 and 29 are mounted in and guided by the valve bore 16 on opposite sides of the piston 22. These heads are biased into sealing engagement with the valve seats 26 and 27 by springs 31 and 32. Annular grooves 33 and 34 are formed in valve bore 16 on opposite sides of the piston 22 for receiving split snap rings 35 and 36. These rings function as limit stops for the valve heads 28 and 29 and the piston 22. The grooves 33 and 34 are so positioned that when the piston 22 is in contact with the ring 35 valve head 29 is held in an unseated position by ring 36, and when the piston is in contact with ring 36 the valve 28 is held in an unseated position by ring 35.

Several features of construction contribute to the simplicity of the valve. The passages 12 through 15 and the chambers 19 and 21 can be formed by cores when the housing 11 is cast. Valve bore 16 is the only surface in the housing requiring accurate machining. Plug 17, valve head 28, spring 31 and snap ring 35 are identical with plug 18, valve head 29, spring 32 and snap ring 36. The opposite end faces 23 and 24 of the piston 22 are identical.

In operation the pressure chambers 19 and 21 are connected in two separate hydraulic lines by passages 12 and 14 and passages 13 and 15, respectively. The pressures in these two chambers act against the faces 23 and 24 and the difference between these pressures causes piston 22 to shift toward that chamber containing the lower pressure. When the pressure differential forces piston 22 to the right into contact with snap ring 36, valve head 28 moves into contact with snap ring 35 and is thus separated from its seat 26. This unseating action permits pressure fluid from chamber 19 to act on that portion of valve head 29 located within axial bore 25. The right side of valve head 29 is subject to the pressure in chamber 21 and, when the pressure differential between the two chambers exceeds a predetermined maximum (determined by the setting of spring 32), valve head 29 will unseat to relieve the pressure in chamber 19. As the pressure differential decreases, spring 32 will move valve head 29 toward its seat 27. When the pressures in the two chambers are again equal the valve elements will have shifted to the positions shown in Fig. 1.

Similar relief action occurs when the pressure differential forces piston 22 to the left as viewed in Fig. 1.

As stated previously, the drawing and description relate only to a preferred embodiment of the invention, and since changes can be made in this embodiment without departing from the inventive concept, the following claims should provide the sole measure of the invention.

What is claimed is:

1. A two-way pressure relief valve comprising a housing; a valve bore formed in the housing; two longitudinally spaced pressure chambers intersecting the bore; a reciprocable piston located in the bore between the two chambers, the opposite ends of the piston being subject to the pressures in the two chambers; an axial bore extending through the piston; valve seats, one carried by each end of the piston and each encircling one end of the axial bore; two reciprocable valve heads guided in the valve bore on opposite sides of the piston, one valve head being associated with each valve seat; springs, one biasing each valve head into engagement with its associated seat; and stops located in the valve bore between each head and the adjacent end of the piston and spaced apart a distance greater than the length of the piston for limiting the motion of the two valve heads and the piston, whereby when the piston has reached the limit of its travel in the direction of either valve head the other valve head is unseated.

2. A two-way pressure relief valve comprising a housing having a through valve bore of constant diameter; threaded plugs closing the opposite ends of the bore; two longitudinally spaced pressure chambers intersecting the bore; a reciprocable piston located in the bore between the chambers, the opposite end faces of the piston forming reaction surfaces which are subject to the pressures in the two chambers; an axial bore extending through the piston; annular valve seats, one carried by each end of the piston and each encircling one end of the axial bore; two reciprocable valve heads guided in the valve bore on opposite sides of the piston, one valve head being associated with each valve seat; springs, one reacting between each threaded plug and valve head for biasing the head into sealing engagement with its associated valve seat; two annular grooves formed in the valve bore on opposite sides of the piston and spaced apart a distance greater than the axial length of the piston, one groove being located between each valve head and the adjacent end of the piston; and a split snap ring mounted in each annular groove, whereby when the piston moves toward either valve head and into contact with one snap ring the other snap ring holds the other valve head in an unseated position.

References Cited in the file of this patent

UNITED STATES PATENTS

| | | |
|---|---|---|
| 2,451,586 | Strid | Oct. 19, 1948 |
| 2,483,312 | Clay | Sept. 27, 1949 |
| 2,721,575 | Gier | Oct. 25, 1955 |